March 19, 1963 E. P. WARNKEN 3,081,705
ARTICLES HAVING LAMINATED WALLS
Filed May 9, 1958 2 Sheets-Sheet 1
FIG. 3.
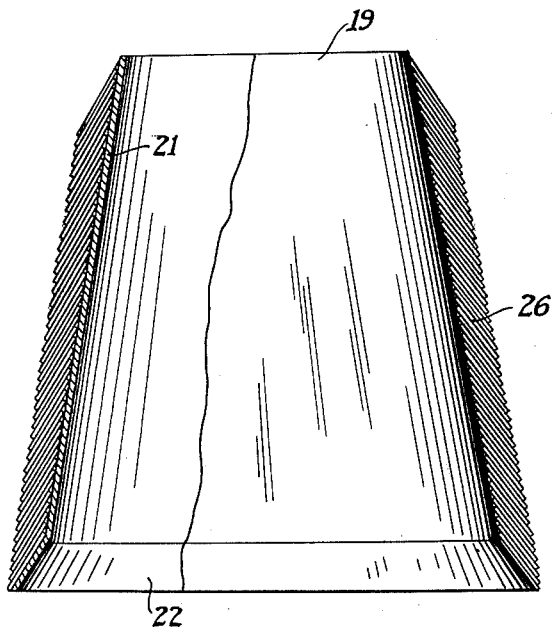
FIG. 2.
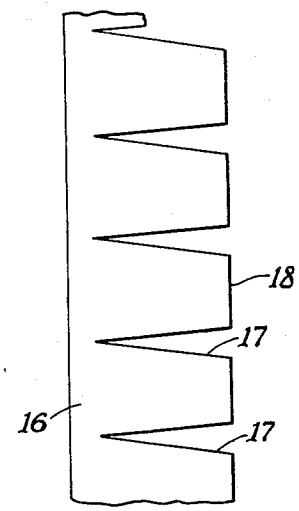
FIG. 1.
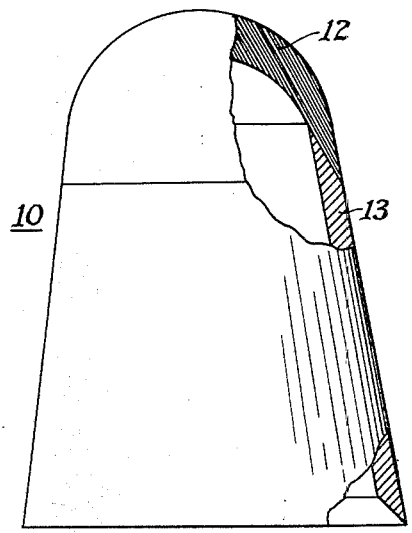
FIG. 4.
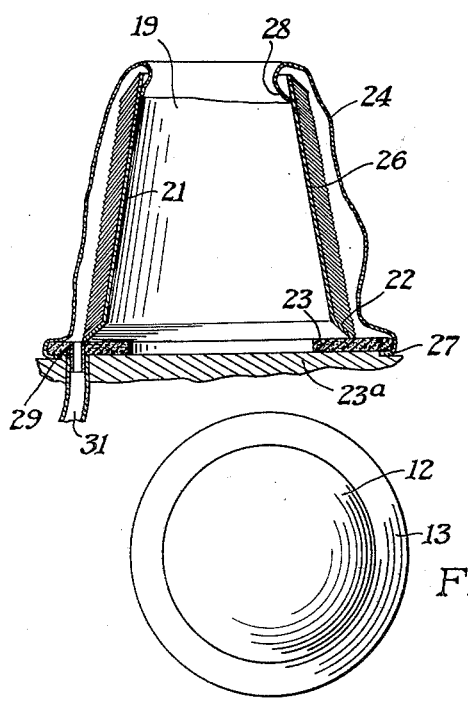
FIG. 5.
INVENTOR.
ELMER P. WARNKEN
BY Jugelter & Jugelter
ATTORNEYS March 19, 1963  E. P. WARNKEN  3,081,705
ARTICLES HAVING LAMINATED WALLS
Filed May 9, 1958  2 Sheets-Sheet 2
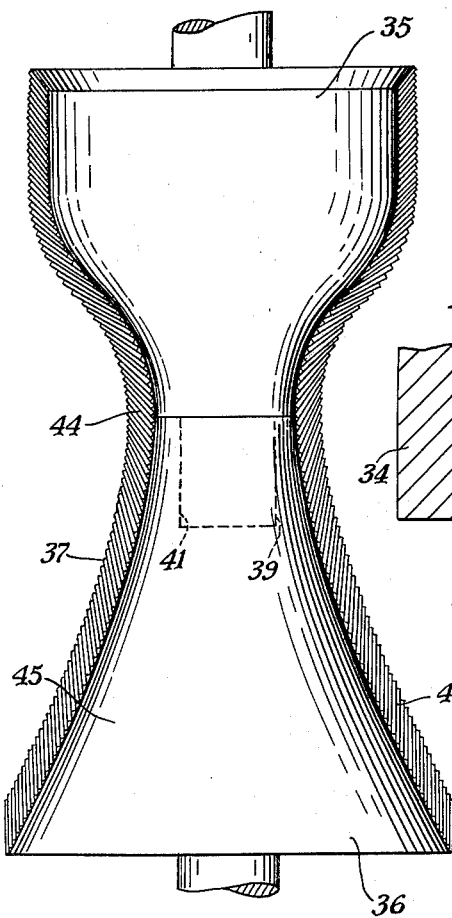
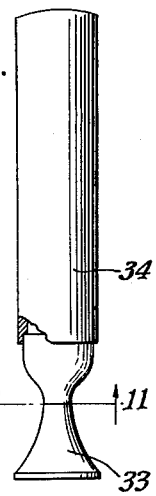
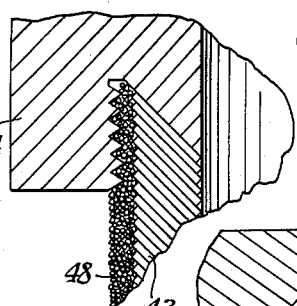
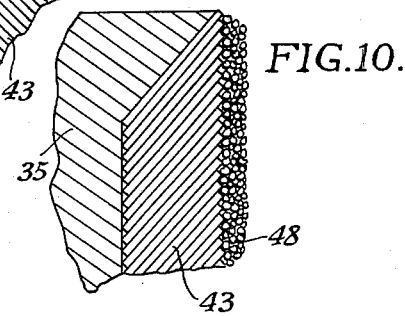
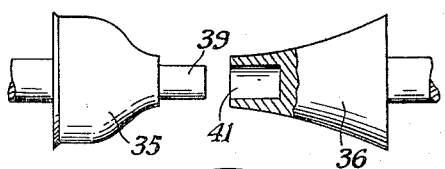
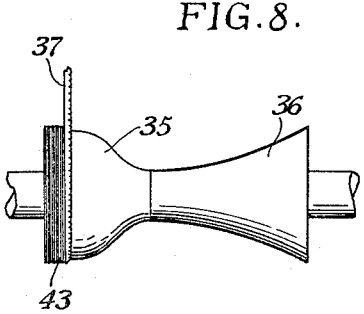
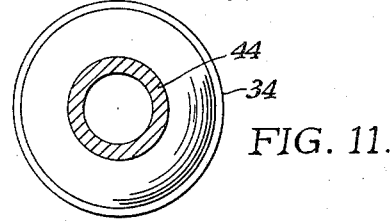
INVENTOR.
ELMER P. WARNKEN
BY Jugelter & Jugelter
ATTORNEYS United States Patent Office 3,081,705
Patented Mar. 19, 1963

3,081,705
ARTICLES HAVING LAMINATED WALLS
Elmer P. Warnken, Cincinnati, Ohio, assignor, by mesne assignments, to Studebaker Corporation, a corporation of Michigan
Filed May 9, 1958, Ser. No. 734,345
14 Claims. (Cl. 102—92.5)

This invention relates to resin-impregnated laminated articles. More particularly, this invention relates to laminated resin-impregnated walls for articles for use in locations where high fluid velocity is encountered.

In bodies having walls which encounter very high fluid velocity, such is in the surfaces of re-entry bodies for ballistic missiles which may be propelled to heights beyond the normal atmospheric levels and must return to earth through the atmosphere, the very rapid passing thereof through the atmosphere causes very tremendous stresses in the wall surfaces thereof and produces great amounts of heat on the surface of the wall. In a similar manner, in the outlet nozzle of a rocket motor, unusually violent stresses and temperatures are developed at the wall surfaces thereof. Conventional laminations, which are laid out parallel to the direction of fluid flow are unsatisfactory in the walls of such bodies because of the tendency of laminations to separate under the influence of the high velocity fluid. On the other hand, if laminations of the wall of such a body are laid up perpendicularly to the direction of fluid flow, there is a tendency for cracks to develop between laminations, and the laminations form relatively short paths through the walls of the body along which the cracks can penetrate to the interior of the wall and along which heat is rapidly conducted to the interior of the body.

An object of this invention is to provide a laminated wall structure for use in a body which encounters very high fluid velocities which resists stripping off or separation of laminations and crack development between laminations.

A further object of this invention is to provide a laminated wall construction in which the laminations are so positioned that transfer of heat along laminations is minimized because of relatively long heat transfer paths along laminations.

A further object of this invention is to provide a laminated wall structure in which the laminations are neither parallel to nor perpendicular to the direction of fluid flow but slope with regard to the direction of fluid flow with the laminations overlapping in such a manner that the high velocity fluid passing the laminations tends to cause the laminations to lie flatwise against each other to resist the tendency to form cracks therebetween.

A further object of this invention is to provide a laminated wall structure in which the sloping laminations form relatively long paths for heat transfer through the wall to minimize heat transfer along the laminations.

A further object of this invention is to provide such a laminated wall structure in which each lamination extends all the way through the wall so that the laminations can not peel off or separate.

A further object of this invention is to provide a re-entry body for a ballistic missile having walls of this type. A further object of this invention is to provide an exhaust nozzle for a rocket motor having laminations which slope with relation to the path of fluid flow on all portions of the interior of the nozzle.

A further object of this invention is to provide a tubular wall for an article of substantially circular cross-section formed of a plurality of laminations extending through the wall and sloping with respect to the faces of the wall.

The above and other objects and features of this invention will be apparent to those skilled in the art to which this invention pertains from the following detailed description, and the drawings, in which:

FIGURE 1 is a view in side elevation, partly broken away and in section, of a nose section for a ballistic missile constructed in accordance with an embodiment of this invention.

FIG. 2 is a plan view of a section of a strip of resin-impregnated material from which the body of the nose section illustrated in FIG. 1 is constructed;

FIG. 3 is a view in transverse section of a mandrel on which the body is formed, with wound laminations wrapped thereon;

FIG. 4 is a view in transverse section showing the mandrel and laminations mounted with a bag surrounding the laminations on a table in position for heating to cause the laminations to adhere together;

FIG. 5 is a top plan view of the nose section of the ballistic missile illustrated in FIG. 1;

FIG. 6 is a view in side elevation of a rocket motor which includes a nozzle constructed in accordance with another embodiment of this invention, the wall of the motor being partly broken away and in section;

FIG. 7 is an exploded view showing sections of a mandrel on which the nozzle is formed;

FIG. 8 is a view in side elevation showing the mandrel in assembled relation, a portion of a winding being shown mounted thereon;

FIG. 9 is a view in lengthwise section showing the laminations in place on the mandrel;

FIG. 10 is an enlarged fragmentary view in side elevation showing a portion of the mandrel and a portion of the laminations and an outermost wrapping thereon;

FIG. 11 is a view in section taken on the line 11—11 in FIG. 6; and

FIG. 12 is an enlarged fragmentary view showing the connection between the nozzle and the rocket motor illustrated in FIG. 6.

In the following detailed description and the drawings, like reference characters indicate like parts.

In FIG. 1 is illustrated a re-entry nose cone 10 for a ballistic missile constructed in accordance with an embodiment of this invention. The nose cone is used as a portion of a missile which is projected to heights above the normal atmosphere, and the nose cone is adapted to re-enter the atmosphere. The nose cone can be attached to the body of the missile (not shown) in any appropriate manner.

Details of the construction of the body 13 are shown in FIGS. 2, 3, 4 and 5. The body is formed from an elongated strip 16 (see FIG. 2) of resin-impregnated glass fibre cloth, or the like. The strip 16 can be formed of glass fibre cloth, or asbestos fibre cloth, or other heat resistant fibrous material or the like. The cloth strip is impregnated with a suitable thermo-setting resin, such as a phenol-formaldehyde resin. The strip 16 is provided with a plurality of triangular slots 17 along a lengthwise edge 18 thereof which extend transversely of the strip. The strip is wound on a mandrel 19 (see FIG. 3). The mandrel 19 is a tubular length of thin-walled metal and includes a main portion 21 of frusto-conic shape and a frusto-conic flange 22 projecting outwardly from the lower edge of the main portion at an angle of approximately 25–30 degrees to the wall of the main portion 21. The strip 16 is wound on the mandrel in the manner indicated in FIG. 2, starting at the flange 22, with the angle of the flange determining the angle at which the laminations slope with regard to the axis of the body. The laminations are wound with the slotted edge adjacent the mandrel so that the laminations lie flat, one on top of the next in face-to-face, overlapping relation. As the strip is wrapped, the edges of the triangular slots approach each other. As shown most clearly in FIG. 3, which shows the laminations wound on the mandrel before molding to laminate the laminations, edges of the laminations overlap in the manner of shingles on a roof of a house.

When the laminations of the strip have been wound on the mandrel 19, the laminations are molded and the resin thereof is set and cured under pressure. The mandrel 19 with the wrapping thereon is placed on a ring of felt 23 or the like on a table 23a and a tubular member or bag 24 of flexible sheet material is mounted in overlying relation to wrapping 26 on the mandrel 19. The tubular member 24 is mounted with one edge 27 underlying the edge of the felt ring and the other edge 28 in engagement with the interior of the mandrel. An appropriate adhesive holds the edge 28 in place. An opening 29 is provided in the felt ring adjacent the edge of the mandrel, and a vacuum line 31 communicates through the opening 29 with the space between the member 24 and the wrapping on the mandrel. A vacuum is drawn on the vacuum line 31 to cause the bag to firmly engage the outside of the wrapping to mold the wrapping. While the vacuum is impressed on the vacuum line, the mandrel, wrapping, and bag are heated to a suitable temperature to set the resin. During molding the laminations swing closer to parallel the faces of the body so that, in a preferred final body, the angle between the laminations and the faces of the body is approximately 20–21 degrees. The resin is then cured in the usual manner to form the completed body.

As shown in FIGS. 1 and 5, the body 13 is assembled with a nose piece 12 to form a completed nose section or a nose cone for a missile. The nose piece 12 can be formed of resin impregnated glass fibre cloth laminations and can be adhesively attached to the body. The body in turn can be attached or connected to the remainder of a missile by any appropriate means, not shown.

The laminations intersect the face of the body over which air flows at a small acute angle therewith so that the tendency of the air pressure on the exterior of the wall is to cause the laminations to lie flatly in face-to-face relation. The sloping aspect of the laminations of the wall of the body of the nose cone with regard to the direction of flow of air past the wall minimizes the likelihood of peeling off of laminations because each lamination extends all the way through the wall of the body. However, heat transfer along the laminations is minimized because of the substantial width of each lamination.

In FIGS. 6 and 7 is shown an exhaust nozzle 33 for a rocket motor 34 which is constructed with a wall having laminations which slope with reference to the surfaces of the wall thereof. The nozzle is mounted at the exhaust end of the motor and hot exhaust gases pass through the nozzle at very high speed.

The nozzle 33 is formed on a two-part mandrel having sections 35 and 36 (FIG. 8) which, when assembled as shown in FIG. 9, have an outer surface on which a strip 37 of resin-impregnated glass fabric is wound. The strip is impregnated with a phenol-formaldehyde resin, or other appropriate resin. The mandrel section 35 is provided with a cylindrical lug portion 39 (FIG. 8) which fits into a socket 41 in the mandrel section 36 to hold the sections in alignment.

The laying up of the strip 37 is started at the thicker end of the mandrel section 35 and progresses toward the narrower end thereof. The angularity of the laminations of wrapping 43 with respect to the mandrel is shown in FIG. 9. The laminations are maintained at substantially a constant angle to the inner face of the nozzle until the narrowest section 44 thereof is reached. As indicated in FIG. 8, the strip is notched along one edge in the section of the strip wrapped on the mandrel 35. A short distance beyond the narrowest section 44, as shown in FIG. 9, the laminations reach a portion at which the laminations are parallel to the axis of the nozzle. Beyond this section the nozzle has a substantially frusto-conic section 45. In the section 45, the laminations are parallel to the axis of the nozzle. The section of the strip from which the section is formed is continuous and not provided with notches. The wrapping on the mandrel is then molded under pressure using bag-molding techniques or other suitable molding techniques and heated to laminate the convolutions of the strip and set the resin thereof to form a laminated main nozzle section.

The laminated nozzle is wound with an outer winding 48 (see FIG. 10) of glass fibre rovings impregnated with a suitable thermosetting resin which are wrapped round and round the main nozzle section to form a substantially continuous circumferential winding giving strength to resist bursting thereof. A plurality of layers of the roving winding 48 may be wrapped on the main nozzle section. The wrapped nozzle is then heated to set and cure the resin of the outer winding in the usual manner. The wrapping can extend part way along the nozzle but preferably extends the entire length thereof. As shown in FIG. 12, the roving winding is sufficiently thick that threads can be cut therein for attaching the nozzle to the body of the rocket motor.

The devices illustrated in the drawings and described above are subject to structural modification without departing from the spirit and scope of the appended claims.

Having described my invention, what I claim as new, and desire to secure by Letters Patent is:

1. A laminated annular wall having a face for engagement by fluid flow, said wall comprising an elongated resin-impregnated flat fabric strip forming a plurality of convolutions arranged in face-to-face, aligned, parallel, overlapping relation with each convolution of the strip extending widthwise of the wall, a minor portion of one face of each convolution being exposed along one edge thereof at said wall face for trailing contact with fluid flow and with a major portion of said convolution face overlapped by an adjacent upstream convolution.

2. A re-entry body comprising a laminated annular wall, said wall having a face for engagement by fluid flow comprising an elongated resin-impregnated flat inorganic fabric strip forming a plurality of convolutions arranged in face-to-face, aligned, parallel, overlapping relation with each convolution of the strip extending widthwise of the wall and through the wall, a minor portion of one face of each convolution being exposed along one edge thereof at said wall face for trailing contact with fluid flow and with a major portion of said convolution face overlapped by an adjacent upstream convolution.

3. A re-entry body comprising a laminated annular frusto-conic wall having a face for engagement by fluid flow, said wall comprising an elongated resin-impregnated inorganic fabric flat strip forming a plurality of convolutions arranged in face-to-face, aligned, parallel, overlapping relation with each convolution of the strip extending widthwise of and through the wall, a minor portion of one face of each convolution being exposed along one edge thereof at said wall face for trailing contact with fluid flow and with a major portion of said convolution face overlapped by an adjacent upstream convolution, and a nose piece attached to and closing the small end of the frusto-conic wall.

4. An exhaust nozzle for a rocket motor which comprises a laminated annular wall having an inner face for engagement by fluid flow, said wall comprising an elongated resin-impregnated flat inorganic fabric strip forming a plurality of convolutions arranged in face-to-face, aligned, parallel, overlapping relation with each convolution of the strip extending widthwise of the wall, a minor portion of one face of each convolution being exposed along an inner edge thereof at said wall face for trailing contact with fluid flow and with a major portion of said convolution face overlapped by an adjacent upstream convolution.

5. An exhaust nozzle for a rocket motor which comprises a laminated annular wall having an inner face for engagement by fluid flow, said wall comprising an elongated resin-impregnated flat inorganic fabric strip forming a plurality of convolutions arranged in face-to-face, aligned, parallel, overlapping relation with each convolution of the strip extending widthwise of and through the wall, a minor portion of one face of each convolution being exposed along an inner edge thereof at said wall face for trailing contact with fluid flow and with a major portion of said convolution face overlapped by an adjacent upstream convolution, and a substantially continuous circumferential resin-impregnated winding surrounding the exterior face of the wall.

6. An exhaust nozzle for a rocket motor which comprises a laminated annular wall having an inner face for engagement by fluid flow, said wall comprising an elongated resin-impregnated flat inorganic fabric strip forming a plurality of convolutions arranged in face-to-face, aligned, parallel, overlapping relation with each convolution of the strip extending widthwise of and through the wall, a minor portion of one face of each convolution being exposed along one edge thereof at said wall face for trailing contact with fluid flow and with a major portion of said convolution face overlapped by an adjacent upstream convolution, and a substantially continuous circumferential resin-impregnated glass fibre roving winding surrounding the exterior face of the wall.

7. An exhaust nozzle for a rocket motor which comprises a laminated annular wall having an inner face for engagement by fluid flow, said wall comprising an elongated resin-impregnated flat inorganic fabric strip forming a plurality of convolutions arranged in face-to-face, aligned, parallel, overlapping relation with each convolution of the strip extending widthwise of and through the wall, the wall having a substantially frusto-conic section, the laminations of said section being substantially cylindrical and coaxial with the axis of said section, a minor portion of one face of each convolution being exposed along an inner edge thereof at said wall face for trailing contact with fluid flow and with a major portion of said convolution face overlapped by an adjacent upstream convolution.

8. An exhaust nozzle for a rocket motor which comprises a laminated annular wall having an inner face for engagement by fluid flow, said wall comprising an elongated resin-impregnated flat glass fibre cloth strip forming a plurality of convolutions arranged in face-to-face, aligned, parallel, overlapping relation with each convolution of the strip extending widthwise of and through the wall, said wall having a substantially fruto-conic section, the laminations of said section being substantially cylindrical and coaxial with the axis of said section, a minor portion of one face of each convolution being exposed along an inner edge thereof at said wall face for trailing contact with fluid flow and with a major portion of said convolution face overlapped by an adjacent upstream convolution, and a substantially continuous circumferential resin impregnated glass fibre roving winding surrounding the exterior face of the wall.

9. A laminated annular wall comprising an elongated resin-impregnated strip forming a plurality of convolutions arranged in face-to-face, aligned, parallel, overlapping relation with each convolution of the strip extending widthwise of the wall, the wall having a face for engagement by fluid flow, the laminations intersecting said wall face at an angle of approximately 20–21 degrees therewith, a minor portion of one face of each lamination along one edge thereof being exposed at said wall face with a major portion of said lamination face being overlapped by an adjacent lamination.

10. A laminated annular wall having a face for engagement by fluid flow, said wall comprising an elongated thermosetting-resin-impregnated flat inorganic fabric strip forming a plurality of convolutions arranged in face-to-face, aligned, parallel, overlapping relation with each convolution of the strip, extending widthwise of the wall, a minor portion of one face of each convolution along one edge thereof being exposed at said wall face for trailing contact with fluid flow and with a major portion of said convolution face being overlapped by an adjacent upstream convolution.

11. A laminated annular wall having a face for engagement by fluid flow, said wall comprising an elongated resin-impregnated flat glass fiber fabric strip forming a plurality of convolutions arranged in face-to-face, aligned, parallel, overlapping relation with each convolution of the strip extending widthwise of the wall, a minor portion of one face of each convolution along one edge thereof being exposed at said wall face for trailing contact with fluid flow and with a major portion of said convolution face being overlapped by an adjacent upstream convolution.

12. A laminated annular wall having a face for engagement by fluid flow, said wall comprising annular resin-impregnated flat fabric strip laminations arranged in face-to-face, aligned, parallel, overlapping relation with each lamination extending widthwise of the wall, a minor portion of one face of each convolution along one edge thereof being exposed at said wall face for trailing contact with fluid flow and with a major portion of said convolution face being overlapped by an adjacent upstream convolution.

13. A laminated annular wall having a face for engagement by fluid flow, said wall comprising annular thermosetting-resin-impregnated inorganic fabric strip laminations arranged in face-to-face, aligned, parallel, overlapping relation with each lamination extending widthwise of the wall, a minor portion of one face of each convolution along one edge thereof being exposed at said wall face for trailing contact with fluid flow and with a major portion of said convolution face being overlapped by an adjacent upstream convolution.

14. A laminated annular wall having a face for engagement by fluid flow, said wall comprising annular resin-impregnated flat glass fiber fabric strip laminations arranged in face-to-face, aligned, parallel, overlapping relation with each lamination extending widthwise of the wall, a minor portion of one face of each convolution along one edge thereof being exposed at said wall face for trailing contact with fluid flow, and with a major portion of said convolution face being overlapped by an adjacent upstream convolution.

References Cited in the file of this patent

UNITED STATES PATENTS

| | | |
|---|---|---|
| 2,013,747 | Dunlap | Sept. 10, 1935 |
| 2,229,982 | Mansur et al. | Jan. 28, 1941 |
| 2,744,043 | Ramberg | May 1, 1956 |
| 2,835,107 | Ward | May 20, 1958 |

OTHER REFERENCES

Fiberglas-Reinforced Plastic as a Rocket Structural (102–43P) Material, Jet Propulsion, November 1956, vol. 26, No. 11, pp. 969–972. (Copy in Div. 10.) Published by the American Rocket Society, New York, N.Y.